United States Patent [19]
Ernst et al.

[11] 3,944,011
[45] Mar. 16, 1976

[54] SUPPORTING THE DRIVEN WHEEL HUB OF A MOTOR VEHICLE

[75] Inventors: Horst M. Ernst, Eltingshausen; Manfred Brandenstein, Aschfeld; Armin Olschewski, Schweinfurt, all of Germany

[73] Assignee: SKF Industrial Trading and Development Company B.V., Amsterdam, Netherlands

[22] Filed: May 31, 1974

[21] Appl. No.: 475,191

[30] Foreign Application Priority Data
June 9, 1973  Germany............................ 2329554

[52] U.S. Cl............................ 180/70 R; 180/43 R
[51] Int. Cl.².......................................... B62D 7/06
[58] Field of Search........ 180/43 R, 43 A, 43 B, 48, 180/70 R

[56] References Cited
UNITED STATES PATENTS

| | | | |
|---|---|---|---|
| 2,075,564 | 3/1937 | Alden | 180/43 R |
| 3,295,626 | 1/1967 | Cadiou | 180/48 |
| 3,583,511 | 6/1971 | Asberg | 180/43 R |
| 3,757,883 | 9/1973 | Asberg | 180/70 R |

*Primary Examiner*—M. H. Wood, Jr.
*Assistant Examiner*—John P. Silverstrim
*Attorney, Agent, or Firm*—Murray Schaffer

[57] ABSTRACT

The driven wheel hub of a motor vehicle is driven by a rotating axle through a homokinetic joint having an inner driving member secured to the axle and an outer driven member. An axial-radial bearing having an outer race ring secured to the vehicle chassis and an inner race ring secured to the wheel or wheel hub is located in association with the homokinetic joint. The inner race ring is provided with a bore the surface of which and the outer surface of the driven member of the homokinetic joint are provided with mating keyways cooperating to secure the respective race ring and the driven member for conjoint rotary movement and relative axial movement therebetween.

7 Claims, 2 Drawing Figures

SUPPORTING THE DRIVEN WHEEL HUB OF A MOTOR VEHICLE

BACKGROUND OF THE INVENTION

The present invention relates to an arrangement for supporting the wheel or the hub of a driven wheel of a motor vehicle and particularly to an arrangement for supporting the wheel or the wheel hub by a combined radial and axial bearing and for driving the same through a homokinetic joint.

Arrangements for supporting the driven wheel hub or boss on which a wheel is mounted are well known. In such arrangements the hub is driven by a rotary axle through a homokinetic joint capable of allowing the wheel to pivot and is rotatably supported on the chassis of the vehicle by a radialaxial bearing (referred to herein as a Radiax bearing) associated with the homokinetic joint. In general, the outer ring of the Radiax bearing of such an arrangement is provided with a flange adapted to be attached to the chassis or other wheel support secured to the chassis and an inner ring which is adapted to be connected to the wheel hub or boss and with the driven portion of the homokinetic joint. In one such well known embodiment shown in the German patent publication DOS No. 1,915,932, guideways or grooves for the balls of the homokinetic joint are formed directly in the bore of the inner race ring of the Radiax bearing. In this form the inner race ring of the Radiax bearing also forms the driven member of the homokinetic joint and transmits the torque from the axle via the balls to the wheel. In another well known design shown in German patent publication DOS No. 2,104,929, the driven member of the homokinetic joint extends within the bore of the inner race ring of the Radiax bearing and is welded to the latter to form a permanent attachment. In both cases, the driven part or member of the homokinetic joint is combined permanently with the Radiax bearing to form one indissoluble and inseparable unit. Thus, in the event of damage to the race members or elements of the homokinetic joint, the entire wheel bearing unit must be replaced. The same thing also happens when the wheel bearing or Radiax is itself damaged. Further, the homokinetic joint is known to wear more rapidly and must be replaced periodically.

Another drawback of the known arrangements arises from the fact that in many vehicles it is necessary to provide for a certain degree of axial shifting between the driving shaft or rotating axle and the driven wheel hub or wheel member itself. Such axial shifting is not readily possible in the known arrangements due to the rigid fixing and joining of the parts of the homokinetic joint with the wheel bearing or Radiax unit.

It is an object of the present invention to provide an arrangement for supporting and driving a wheel or a wheel hub, of the type described in which the disadvantages and defects of the prior art arrangements are overcome.

It is another object of the present invention to provide an arrangement for supporting and driving a wheel or wheel hub, of the type described in which the homokinetic joint and the Radiax bearing are easily separable from each other so that either the homokinetic joint or the Radiax bearing may be replaced separately and individually without any difficulty.

It is a further object of the present invention to provide an arrangement for supporting and driving a wheel or wheel hub, of the type described, in which a degree of axial shifting between the driving shaft or rotating axle and the driven wheel or hub member is permitted.

The foregoing objects, together with other objects and the numerous advantages of the present invention will be apparent from the following disclosure of certain embodiments of the invention.

SUMMARY OF THE INVENTION

According to the present invention the bore of the inner race ring of the Radiax bearing and the outer surface of the driven member of the homokinetic joint are each provided with mating keyways or conforming profiles fitting one into the other. Through this form of keyway construction the driving force or torque from the driven member of the homokinetic joint is transmitted to the inner race ring of the supporting bearing and therefore to the wheel or wheel hub which conjointly rotates therewith. At the same time this keyway construction permits the axial shifting of the radial bearing relative to the homokinetic joint. In the event of wear or damage to either the members of the homokinetic joint or to the supporting Radiax bearing itself, the Radiax bearing can be pulled axially off of the driven member of the homokinetic joint without any difficulty and may be easily replaced. The keyway structure also insures the axial shifting of the inner race ring of the Radiax wheel bearing with regard to the driven part of the homokinetic joint without any reduction or loss of power transmission.

Full details of the present invention are set forth in the two practical examples described hereinbelow and shown in the accompanying drawing.

DESCRIPTION OF THE INVENTION

Figure 1:
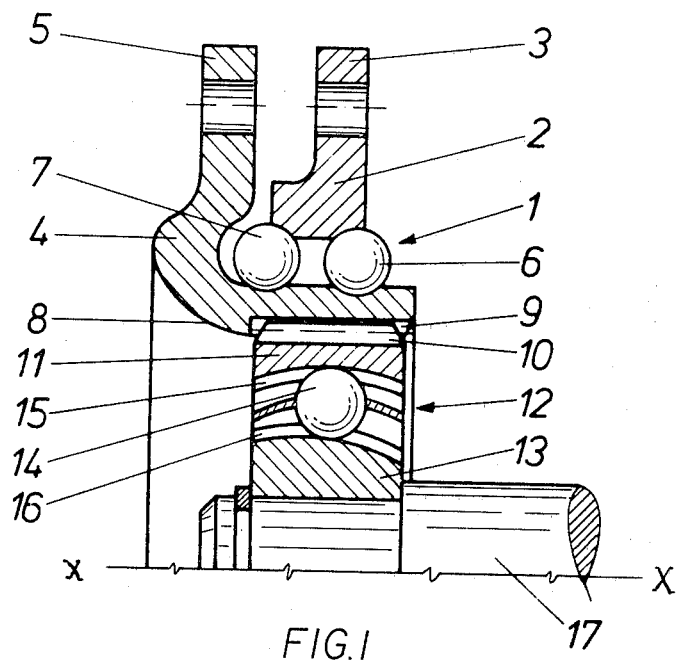
FIG. 1 is an axial section through an arrangement for supporting the hub of a driven wheel embodying the principles of the present invention.

In the example shown in FIG. 1 a Radiax bearing, generally depicted by the numeral 1 is provided. The Radiax bearing 1 comprises an outer race ring 2 having a radially extending flange 3 in which one or more axially extending holes are formed by which the ring may be attached to the corresponding wheel support or vehicle chassis portion (not shown) so as to be fixed against rotation. The Radiax bearing also includes an inner race ring 4 which is similarly provided with a radially extending flange 5 having axial holes by which it is adapted to be attached to the wheel or perhaps to the brake plate of the wheel drum (not shown). Arranged between the outer race ring 2 and the inner race ring 4 are two rows of rolling bodies 6 and 7 respectively. The rolling bodies are preferably ball bearing elements. The inner and outer race rings are formed with race surfaces which are arranged in such a way that the double row of rolling elements 6 and 7 respectively have contact planes and force directions which extend obliquely to the axis of rotation of the wheel, defined by the axis X—X. The angular contact of the ball bearing elements in the respective race surfaces provides the so-called Radiax bearing which is capable thusly to take up forces in both the radial and axial directions.

Located within the axial bore 8 of the inner race ring 4 of the Radiax bearing is the homokinetic joint, generally depicted by the numeral 12 secured to the driving axle 17. The homokinetic joint is located generally in line with the ball bearings of the Radiax unit and thus within the transverse plane of the Radiax bearing. The homokinetic joint comprises an outer driven member 11 and an inner driving member 13 between which a plurality of balls 14 are arranged. The opposing faces of the driven member 11 and the driving member 13 are provided with race grooves 15 and 16 of predefined suitable configuration so that the balls 14 are capable of transmitting the power or torque from the driving member 13 to the driven member 11. The driving member 13 of the homokinetic joint 12 is secured to the axle 17 by suitable keying or splining and is retained thereon by a ring type fastener. The opposing race surfaces of the driven and driving members 11 and 13 respectively are curved in cross section so that the axle 17 and the Radiax bearing are permitting slight degrees of pivotal movement relative to each other while simultaneously rotating under the transmission of power via the balls 14.

The face of the bore 8 of the inner race ring of the Radiax bearing is provided with keyway sections 9 which act in conjunction with corresponding keyway profiled sections 10 formed on the outer surface of the driven member 11 of the homokinetic joint 12. In general the keyways comprise axially extending gear-like teeth and valleys. The keyways may also take the form of axially extending splines. The keyways thus mate and engage permitting conjoint rotation of the driven member 11 of the homokinetic joint and the inner race ring 4 of the Radiax supporting bearing 2. The keyway sections 9 open to the axial frontal edge of the inner race ring 1 and thus permit the axial relative movement of the inner race ring 4 with respect to the driven member 11 of the homokinetic joint. The homokinetic joint and the Radiax bearing are thus permitted a degree of shifting during operational function and are easily separated from each other when disassembly of the arrangement is required.

Figure 2:
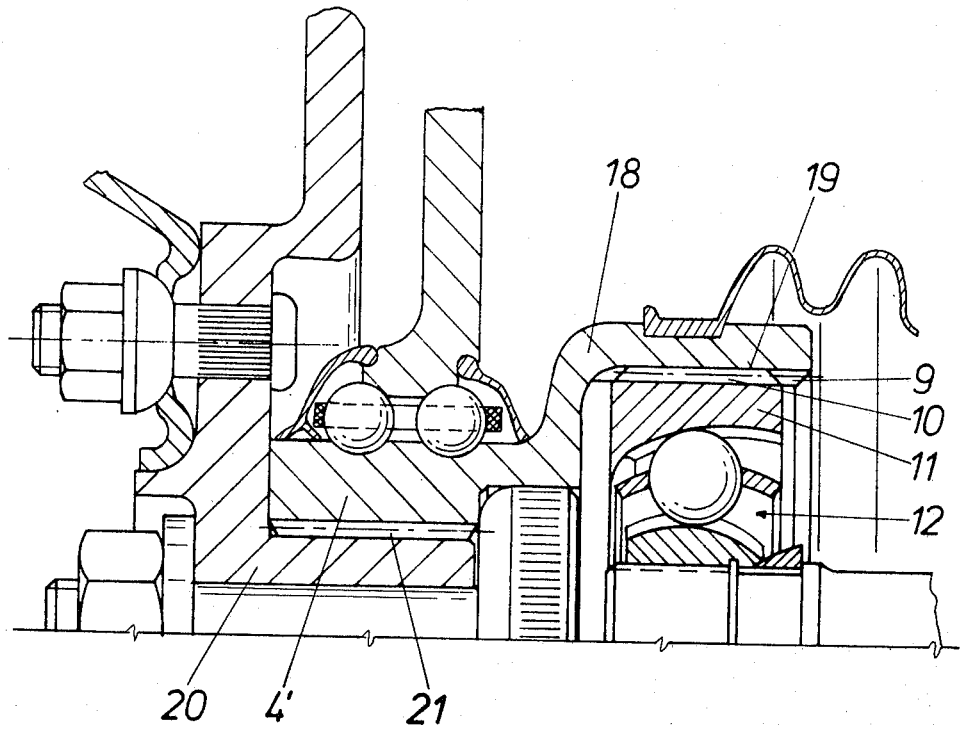
FIG. 2 is a similar view of a second embodiment of the present invention.

In the embodiment shown in FIG. 2 the arrangement is similar to that of FIG. 1 except here, the inner race ring 4' is provided having a funnel shaped or cup-shaped radial enlargement 18 at its axial end extending into an annular wall 19 which extends over and surrounds the driven member 11 of the homokinetic joint 12. As seen in FIG. 2 the radial extent of the homokinetic joint 12 is larger than that shown in FIG. 1 and instead of being set within the bore of the inner race member 4' generally in the transverse plane of the Radiar bearing, it is axially offset outside of the Radiax bearing.

The inner surface of the annular wall 19 is provided with axial recesses or grooves forming the keyway sections 9 while the outer surface of the driven member 11 is formed with similar keyway surfaces 10, all in the manner described with regard to FIG. 1. The inner race ring 4' is mounted directly about the hub 20 of the wheel by providing mating keyway teeth 21 on the corresponding opposite surfaces of the race ring 4' and the hub 20. Instead of teeth suitable splining or similar keyway configurations can be employed. FIG. 2 also shows the use of suitable seal and covering members for both the Radiax bearing as well as the homokinetic joint. The assembly of the wheel to the hub 20 is also indicated. In general, however, the construction of FIG. 2 and of FIG. 1, not described in detail herein, follow the conventional and well known techniques for mounting motor vehicle wheels which are to be driven. As seen further in FIG. 2 the Radiax bearing includes a cage for holding the ball elements. Various Radiax or combined axial-radial bearings may be employed other than the particular type shown.

The present invention is characterized by providing an arrangement wherein the Radiax bearing and the homokinetic joint are maintained independent and separable from each other. The interface surfaces between the bearing and the homokinetic joint are provided with mating keyways 9 and 10 which cooperate to provide conjoint rotation but enable axial shifting and axial removal of the two elements one from each other. Thus the present invention provides the ability of separating the wheel bearing support unit from the homokinetic joint and enables the replacement of any damaged part without the necessity of discarding the entire assembly. Moreover, the relative axial movement permitted between the Radiax bearing and the homokinetic joint, within predefined limits thus enables the assembly to compensate for any variations in the position of the driving shaft or axle 17 under normal road driving conditions and thus reduces the possibility of damage and breakage.

Various modifications, forms and changes have been suggested in the preceding description and disclosure of the present invention. Other modifications, changes will be obvious to those skilled in the present art. It is intended therefore that the present disclosure be taken as illustrative only of the invention and not as limiting of its scope.

What is claimed is:

1. An arrangement for supporting the wheel or the hub of a driven wheel of a motor vehicle on the chassis thereof and for driving the wheel through a rotating axle comprising a homokinetic joint having an inner driving member secured to said axle and an outer driven member, a bearing comprising an outer race ring fixedly secured to said vehicle chassis, an inner race ring secured to said hub for rotation therewith, said inner race ring having a bore, the contiguous surfaces of said bore and of said driven member having mating keyways along their length cooperating to slidably interconnect said respective inner race ring and said driven member for simultaneous conjoint rotary movement and relative axial shifting there along during operation to permit relative axial movement between said bearing and said homokinetic joint.

2. The arrangement according to claim 1 wherein said keyway comprises axial teeth formed on the surface of the respective members.

3. The arrangement according to claim 1 wherein the driving member and the driven member of said homokinetic joint comprise annular race rings between which a plurality of ball bearings are located, said race rings having curved surfaces permitting said members to pivot with respect to each other about a central point.

4. The arrangement according to claim 1 wherein said support bearing includes a double row of ball bearings and said race members have race surfaces inclined to the axis of rotation for absorbing both radial and axial loads.

5. The arrangement according to claim 4 wherein said inner and outer race members are provided with radially extending flanges, the flange of said outer race ring being removably secured to said vehicle chassis, the flange of the inner race ring being removably secured to said wheel or wheel hub.

6. The arrangement according to claim 5 wherein said inner race ring comprises an annulus and the bore of said inner race ring is the inner bore of said annulus, said homokinetic joint extending within said bore and in line with the plane of rotation of said bearing.

7. The arrangement according to claim 1 wherein said inner race ring is provided at one of its axial ends with a radially widened annular wall extending over said driven member, the inner surface of said wall forming said bore and being provided with said cooperating keyway.

* * * * *